UNITED STATES PATENT OFFICE.

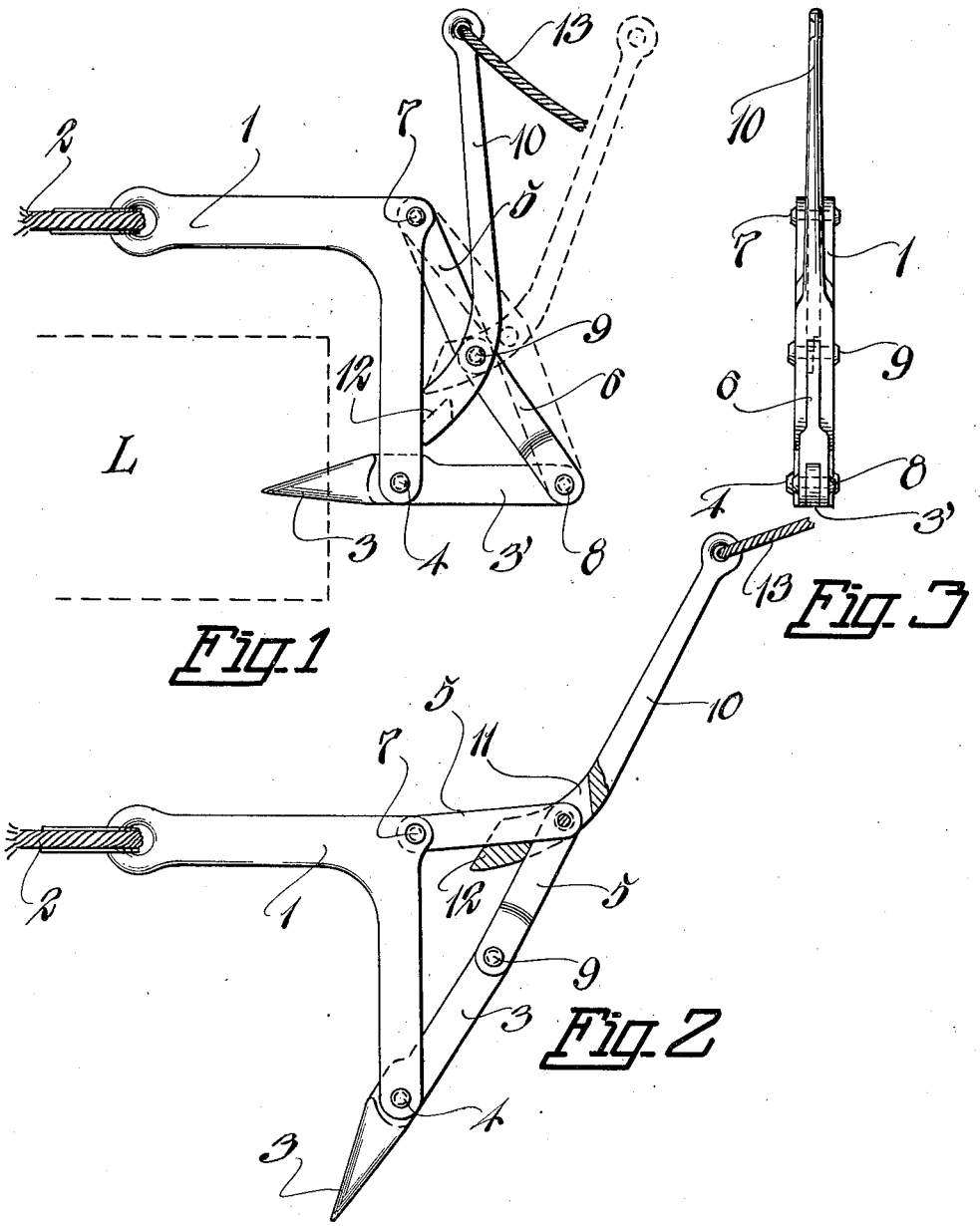

DANIEL McGINNIS, OF ST. MARIES, IDAHO.

JAMMER-HOOK.

1,383,649.   Specification of Letters Patent.   Patented July 5, 1921.

Application filed September 13, 1920. Serial No. 409,931.

*To all whom it may concern:*

Be it known that I, DANIEL McGINNIS, a citizen of the Dominion of Canada, and subject of the King of Great Britain, residing at St. Maries, in Kootenai county, and State of Idaho, have invented certain new and useful Improvements in Jammer-Hooks, of which the following is a specification.

The present invention relates to an improved jammer hook designed especially for use in timber and logging operations, and at mills, where the log is dragged along flumes, chutes, &c., and particularly adapted for facile release from the log when desired.

The primary object of the invention is the provision of a hook of this character which is applicable for use in towing or hauling logs and will hold rigidly thereto as an anchoring device for the tow or drag line, and which may be released from holding position by a pull or tug on a release rope or cable, thus facilitating the manipulation of the log for expeditious operations.

To this end the invention consists essentially in the combination with a hook provided with a movable engaging member or point, and connections between these elements of the hook and co-acting therewith for releasing the hook point from a log, as will be hereinafter more specifically pointed out and claimed.

In the accompanying drawings I have illustrated one complete example of the physical embodiment of my invention constructed and arranged according to the best mode I have thus far devised for the practical application of the principles of my invention.

Figure 1 is a view illustrating the jammer hook or drag hook applied to the rear end of a log that is supposed to be hauled, the device being shown in disengaged position in dotted lines.

Fig. 2 is a view of the hook detached, and partly in section, in released position, the parts being brought to this position by a pull on the release rope indicated at the right.

Fig. 3 is a rear edge view of the hook in full line position of Fig. 1.

In the preferred form of my invention as depicted in the drawings I have shown in dotted lines a log L with which the hook is adapted for use.

The hook includes the rigid angular member 1 to which the drag rope 2 is attached by an eye and ring as usual, and to this rigid member, the hook point 3 is pivoted at 4. The shank 3' at the end of which the point 3 is fashioned, and the hook member 1 are made of suitable forged metal of proper dimensions, and the shank is freely movable on the angular hook member to form a flexible dragging device for the log.

The relatively movable hook and shank, however, are coupled together by means to prevent disengagement of the shank from the log, and for this purpose I utilize a pair of links 5 and 6, pivoted respectively to the hook 1 at 7 and to the shank at 8, and at 9 these links are pivoted to a release lever 10. To accommodate the pivoted ends of the links, the lever is slotted at 11, and fashioned with a head 12 beyond the slot to limit the contraction of this link connection when the release lever is actuated, as seen in Fig. 2. Preferably the hook is bifurcated or forked to receive the shank 3' and to receive the link 5, and the link 6 is offset or bifurcated for its pivotal connection 8 with the shank, in order that the parts may be compactly joined to afford bracing and reinforcement of the members one with another. At the free end of the lever 10 a release cord or cable 13 is attached, and by means of which a pull thereon will release the shank point from the log.

With the hook in locked position as in full lines in Fig. 1, wherein the strain of hauling or dragging the log is imposed on the hook shank, the head 12 of the lever is engaged with the rear edge of the hook 1 and the pivot point 9 of the links is offset or out of alinement with the two pivot points 7 and 8. Thus the hook and its shank are held in rigid relationship by the pull on the drag line 2, as long as the pivot 9 is held, by the action of the drag line, within the line between the pivots 7 and 8.

The shank-point may be driven into the end of the log by a blow from a hammer or other device, and then the lever and links swung to the locked position as shown in Fig. 1. When the log has reached its destination, or for any other reason, the hook is to be detached and the shank-point disengaged from the log, the pull or release rope may be pulled by hand to actuate the lever 10. In this instance the fulcrum of the lever is the head 12 in contact with the rear edge of the hook, and the load is imposed on the lever at the pivot point 9. With the head 12 as a center, the lever is swung backward to dotted position in Fig. 1, pulling the pivot 9 of the links across the line between points 7 and 8 to unlock the hook and its shank, and a continued pull on the lever results in a contraction, or folding action of the links similar to the action of a knife blade, causing the point of the shank to be pried out of the log end. The parts or links may contract to the point indicated in Fig. 2, where the head 12 forms an abutment against further movement of the links, after the shank point has been withdrawn from the log.

The hook and its flexible connections are strong and durable, and well adapted for heavy work, while the release device is flexible and facile in its operation, and effective in performing its required functions.

Having thus fully described my invention, what I claim as new and desire to secure by Letters Patent is—

1. The combination with an angular hook and its pivoted pointed shank, of a pair of flexible links connecting said members, and a release lever pivoted to said links having a fulcrum on said hook.

2. The combination with an angular hook and its pivoted pointed shank, of a pair of pivoted links pivoted to said respective members, and a lever pivoted on the joint between said links having a bearing on said hook to lock the parts in rigid relationship.

3. The combination with a hook and its pivoted pointed shank, of a pair of pivoted links pivoted to said hook and shank, a slotted release lever pivoted at the joint of said links and provided with a bearing head engaging said hook for the purpose described.

4. The combination with an angular hook and its pivoted shank, of a pair of pivoted links pivoted to said hook and shank, a slotted lever pivoted on the joint of said links and a head on said lever to engage said hook and forming an abutment to limit movement of said links.

In testimony whereof I affix my signature.

DANIEL McGINNIS.